(12) United States Patent
Mao et al.

(10) Patent No.: US 9,140,928 B2
(45) Date of Patent: Sep. 22, 2015

(54) PANEL DISPLAY DEVICE

(71) Applicant: Lexvu Opto Microelectronics Technology (Shanghai) Ltd, Shanghai (CN)

(72) Inventors: Jianhong Mao, Shanghai (CN); Deming Tang, Shanghai (CN)

(73) Assignee: LEXVU OPTO MICROELECTRONICS TECHNOLOGY (SHANGHAI) LTD, Shanghai (CN)

( * ) Notice: Subject to any disclaimer, the term of this patent is extended or adjusted under 35 U.S.C. 154(b) by 190 days.

(21) Appl. No.: 13/840,200

(22) Filed: Mar. 15, 2013

(65) Prior Publication Data

US 2014/0267979 A1     Sep. 18, 2014

(51) Int. Cl.
  *G02F 1/1335*   (2006.01)
  *G02B 26/08*   (2006.01)

(52) U.S. Cl.
  CPC ...... *G02F 1/133536* (2013.01); *G02B 26/0833* (2013.01); *G02F 1/133602* (2013.01); *G02F 1/13362* (2013.01); *G02F 2001/133548* (2013.01); *G02F 2001/133557* (2013.01); *G02F 2001/133565* (2013.01)

(58) Field of Classification Search
  CPC .............. G02F 1/292; G02F 1/133528; G02F 2201/305; G02F 2001/133548; G02F 1/133602; G02F 2001/133565; G02F 2001/133557; G02F 1/13362
  USPC .............................. 349/96–98, 193, 201–202
  See application file for complete search history.

(56) References Cited

U.S. PATENT DOCUMENTS

| | | | | |
|---|---|---|---|---|
| 5,012,141 | A | * | 4/1991 | Tomisawa ..................... 327/276 |
| 8,537,310 | B2 | * | 9/2013 | Escuti et al. .................... 349/96 |
| 2007/0268428 | A1 | | 11/2007 | Choi et al. |

* cited by examiner

*Primary Examiner* — Dung Nguyen
(74) *Attorney, Agent, or Firm* — Harness, Dickey & Pierce, P.L.C.

(57) ABSTRACT

A panel display device is provided, which includes: a transparent back panel having a first surface and a second surface, where the first surface is adapted for reflecting incident lights from the outside, and the second surface is adapted for transmitting lights from the outside; a backlight source, disposed at one side of the second surface of the transparent back panel, which is adapted for emitting lights to the transparent back panel; a polarized grating, disposed at one side of the first surface of the transparent back panel, which includes a plurality of grating strips with gaps formed between neighboring grating strips, where the polarized grating enables the incident lights from the transparent back panel to be polarized and then pass through the gaps; a semiconductor switch array; and a transmission light valve array. The panel display device of the disclosure increase the utilization efficiency of lights.

8 Claims, 5 Drawing Sheets

PANEL DISPLAY DEVICE

FIELD OF THE DISCLOSURE

The present disclosure generally relates to a display device, and more particularly, to a panel display device.

BACKGROUND

Typically, panel devices include Liquid Crystal Display (LCD) device and Light Emitting Diode (LED) display device. LCD devices have characteristics of thin structure and low power consumption, which thereby are widely used as a computer's monitor, or a monitor of a portable communication device, such as a mobile telephone, or the like. The existing LCD devices include projection-type LCD, reflection-type LCD and semipermeability LCD. Permeability LCD uses a transparent electrode as a pixel electrode to apply a voltage to a liquid crystal layer, and a backlight source is disposed at the back of the LCD.

FIG. 1 schematically illustrates a structure of a conventional LCD device. Referring to FIG. 1, the LCD device includes: a backlight source 100 for emitting white lights; a bottom polarized layer 102 made of an organic material, through which vertical components of the lights from the backlight source 100 may pass; a transparent insulation layer 112 formed on the bottom polarized layer 102; a plurality of thin film transistors 105 formed on the transparent insulation layer 112, where a transparent insulation material are formed within and overlying the plurality of thin film transistors 105, which are used to protect the plurality of thin film transistors 105; a liquid crystal layer 107 formed on the plurality of thin film transistors 105; an optical filter 108 formed on the liquid crystal layer 107; and a top polarized layer 110 formed on the optical filter 108.

More information about the conventional LCD device may refer to US patent application No. US20070268428A1. The conventional LED display device uses a light valve array instead of the liquid crystal layer to output images, accordingly, a higher luminous efficiency can be achieved, compared with the LCD device.

Referring to FIG. 1, the bottom polarized layer 102 including an organic material enables the vertical component of the lights from the backlight source 100 to pass therethrough, while other components other than the vertical components may be absorbed by the bottom polarized layer 102, as a result, the conventional panel display device has a low utilization efficiency of the light from the backlight source 100.

SUMMARY

Embodiments of the present disclosure provide a panel display device, which improves the utilization efficiency of lights from the backlight, decreases power consumption, thereby satisfying requirements of applications.

One embodiment of the present disclosure provides a panel display device, which may include:

a transparent back panel, having a first surface and a second surface, where the first surface is adapted for reflecting incident lights from the outside, and the second surface is adapted for transmitting lights from the outside;

a backlight source, disposed at one side of the second surface of the transparent back panel, which is adapted for emitting lights to the transparent back panel;

a polarized grating, disposed at one side of the first surface of the transparent back panel, which includes a plurality of grating strips with gaps formed between neighbouring grating strips, where the polarized grating enables the incident lights from the transparent back panel to be polarized and pass through the gaps;

a semiconductor switch array, disposed at one side of the first surface of the transparent back panel; and a transmission light valve array, disposed at a surface of the polarized grating and the semiconductor switch array, where the surface is far away from the first surface of the transparent back panel.

Optionally, each of the plurality of grating strips may have a same width in a range from about 50 nm to about 10 μm. The gaps formed between neighbouring grating strips may have a same width in a range from about 50 nm to about 10 μm.

Optionally, the transmission light valve array may be a liquid crystal layer or a MEMS light valve array. The semiconductor switch array may be a thin film transistor array or a MEMS switch array.

Optionally, one of the plurality of grating strips may have a thickness in a range from about 0.1 μm to about 10 μm.

Optionally, the polarized grating may include a plurality of first grating strips and a plurality of second grating strips. Gaps between the plurality of first grating strips may be the same. The positions of the plurality of second grating strips correspond to that of the semiconductor switch array, and the plurality of second grating strips may have a width greater than that of the plurality of first grating strips.

Optionally, each of the plurality of first and second grating strips may have a width ranging from about 50 nm to about 10 μm. The plurality of first and second grating strips may have gaps ranging from about 50 nm to about 10 μm.

Optionally, the semiconductor switch array may include a storage circuit and/or a control circuit, where the position of the storage circuit and/or the control circuit corresponds to that of the plurality of second grating strips, the storage circuit is adapted for storing data required for operation of the panel display device, and the control circuit is adapted for controlling the operation of the panel display device.

Optionally, the polarized grating may be made of metal comprising copper, aluminum, gold, silver, titanium, tungsten, or a combination thereof.

Compared with the prior art, this disclosure has the following characteristics:

The polarized grating of the panel display device according to the present disclosure enables the lights from the backlight source to be polarized and pass through neighbouring grating strips, which improves the utilization efficiency of lights from the backlight, decreases power consumption, thereby satisfying requirements of applications.

Optionally, a storage circuit and/or a control circuit may be formed at the back of the plurality of grating strips, where the storage circuit is adapted for storing data required for operation of the panel display device. Thereby scanning speed of the panel display device can be increased, and driving capability can be improved.

DETAILED DESCRIPTION OF THE DISCLOSURE

Figure 1:
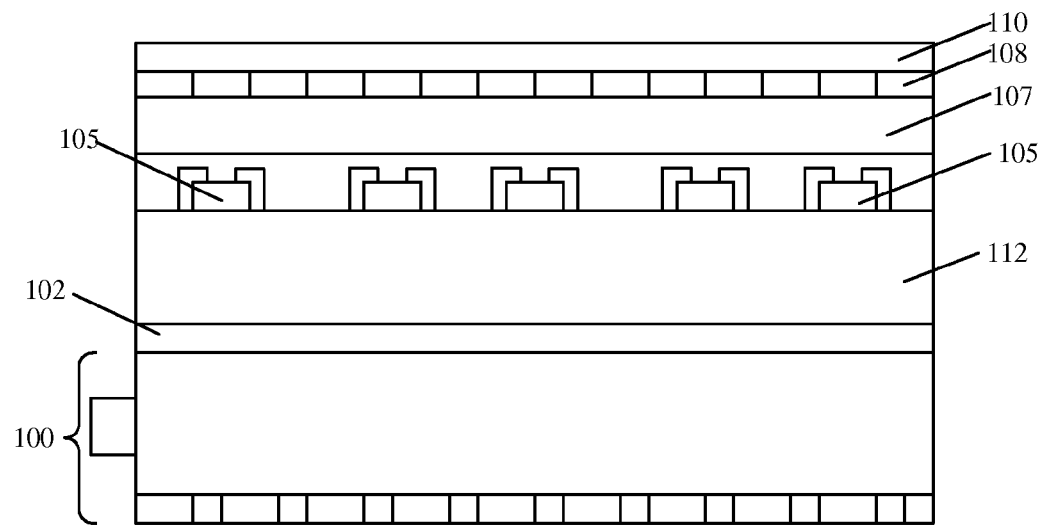
FIG. 1 schematically illustrates a structure of a conventional LCD device.

The disclosure will be described in detail with reference to certain embodiments. For understanding the technical solution of the present disclosure more clearly, please refer to FIG. 2 which schematically illustrates a cross-sectional view of a panel display device according to the first embodiment of the present disclosure. In the embodiment, the panel display device is a LCD device. The LCD device includes: a transparent back panel 202, a backlight source 200, a polarized grating 204, a semiconductor switch array 206, a transmission light valve array 207, an optical filter 208 and a top polarized layer 210.

Specifically, the transparent back panel 202 has a first surface and a second surface. The first surface is adapted for reflecting incident lights from the outside, and the second surface is adapted for transmitting incident lights from the outside. The transparent back panel 202 may be made of glass. And the first surface may have a reflection coating film thereon.

The backlight source 200 is disposed on one side of the second surface of the transparent back panel 202, which is adapted for emitting lights to the transparent back panel 202. In some embodiments, the backlight source 200 may be an edge-lighting backlight source 200, which further include: a light source 2001 and a light guide plate 2002. The light source 2001 is disposed at one side of the light guide plate 2002. The surface of the light guide plate 2002 near to the transparent back panel 202 is a transparent surface pervious to light, while the surface of the light guide plate 2002 away from the transparent back panel 202 and the surface of the light guide plate 2002 opposite to the light source 2001 are reflection surfaces. The reflection surfaces are adapted for reflecting the lights from the light source 2001, which may pass through the transparent surface of the light guide plate 2002.

In some embodiments, a dodging device may be disposed on the surface of the light guide plate 2002 away from the transparent back panel 202, which enables lights from the light source 2001 to be transmitted uniformly, thereby improving the display quality. The light source 2001 may be a point light source or a line light source. The lights emitted from the light source 2001 may be a monochrome sequential light or a white light. The monochrome light may be a red light, a blue light or a green light, three of which are three primary colors and alternate with one another. The light source 2001 may emit lights of three primary colors alternately, thereby the LCD device may achieve color display without optical filters.

In some embodiments, the backlight source 200 may be a bottom-lighting backlight source 200, which may include a light source and a light guide plate. The light guide plate is disposed at one side of the second surface of the transparent back panel, which is adapted for guiding the lights from the light source to the transparent back panel. The light source is disposed at one side of the light guide plate away from the second surface.

Figure 3:
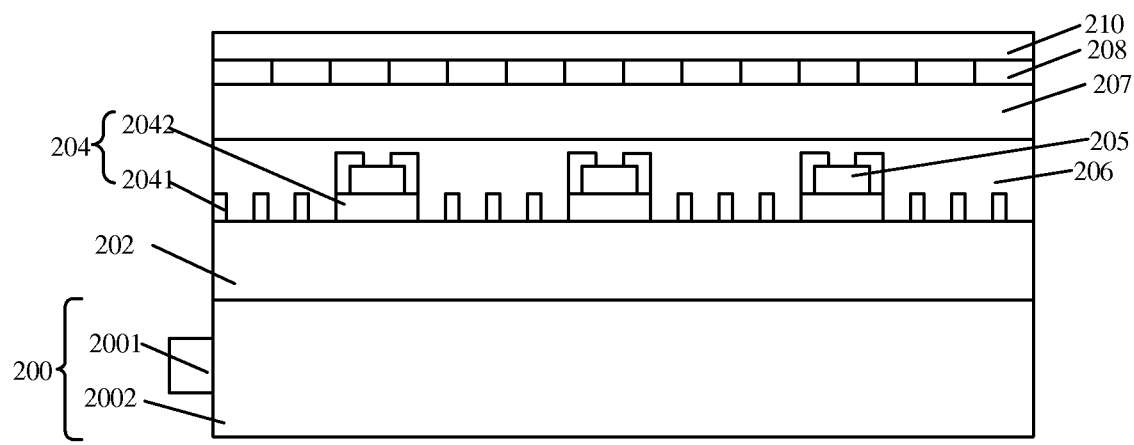
FIG. 3 schematically illustrates a cross-sectional view of a panel display device according to a second embodiment of the present disclosure.
Figure 4:
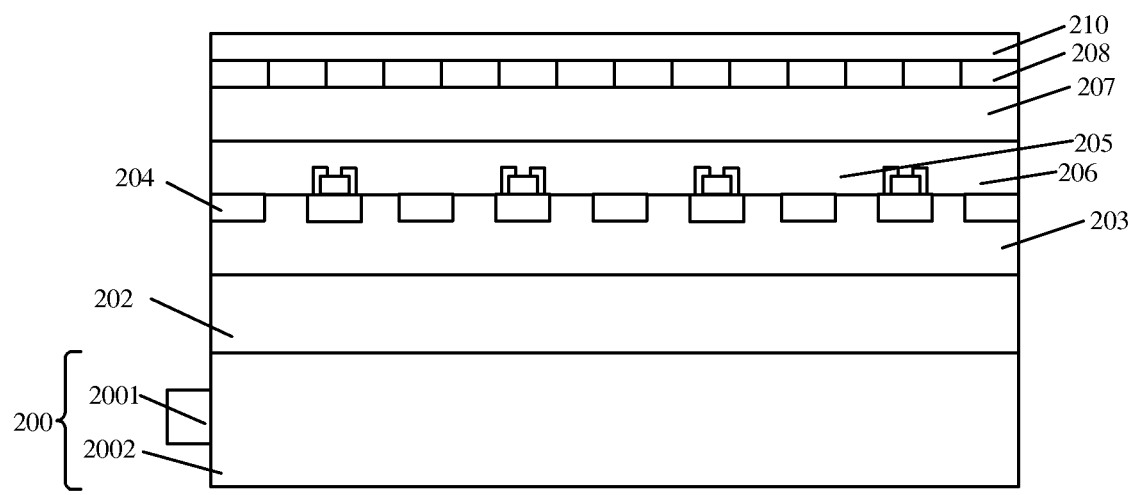
FIG. 4 schematically illustrates a cross-sectional view of a panel display device according to a third embodiment of the present disclosure.

In some embodiments, an insulation layer 203 may be formed between the polarized grating 204 and the transparent back panel 202, and between grating strips of the polarized grating 204. The insulation layer 203 may be made of a transparent material. The insulation layer 203 is adapted for buffering stress between the polarized grating 204 and the transparent back panel 202. In some embodiments, the insulation layer 203 may include one of silicon oxide, silicon nitride, silicon oxynitride, silicon carbide and a combination thereof. In some embodiments, the polarized grating 204 may be directly formed on the transparent back panel 202, which may refer to FIG. 3 illustrating a cross-sectional view of a panel display device according to a second embodiment of the present disclosure. As shown in FIG. 3, the polarized grating 204 is directly formed on the transparent back panel 202, other structures of the second embodiment are the same as those of the first embodiment.

The polarized grating 204 is disposed on the first surface of the transparent back panel 202. The polarized grating 204 includes a plurality of grating strips with gaps between neighbouring grating strips. The polarized grating 204 enables the incident lights from the transparent back panel 202 to be polarized and to pass through the gaps. The widths of the grating strips may be either the same or different. The polarized grating 204 may be made of one selected from copper, aluminum, gold, silver, titanium tungsten, or a combination thereof.

Figure 2:
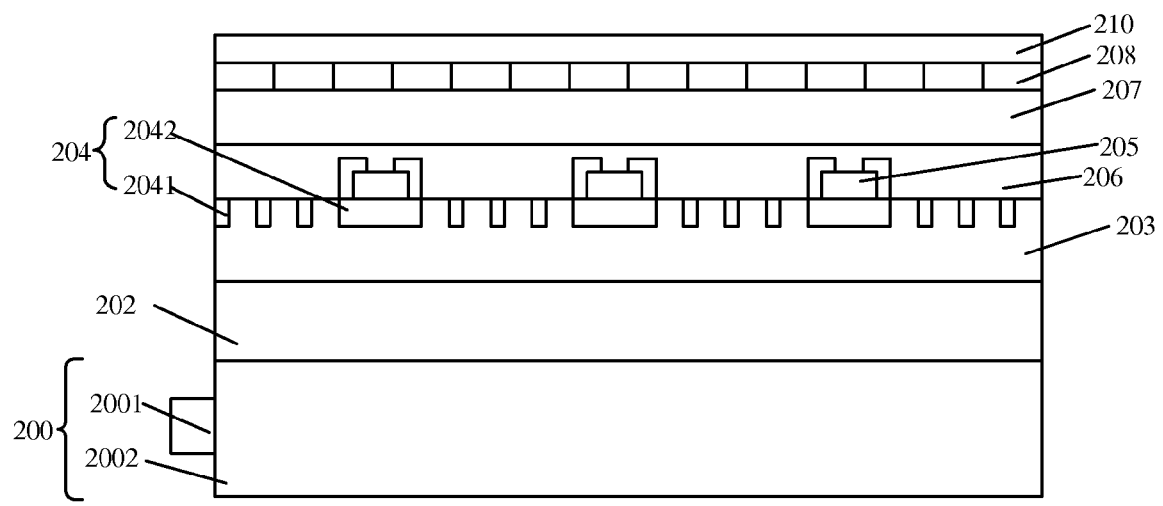
FIG. 2 schematically illustrates a cross-sectional view of a panel display device according to a first embodiment of the present disclosure.

In some embodiments, referring to FIG. 2, the polarized grating 204 may include: a plurality of first grating strips 2041 and a plurality of second grating strips 2042. Gaps between the plurality of first grating strips 2041 may be the same. The positions of the plurality of second grating strips 2042 correspond to that of the semiconductor switch array 206, and the plurality of second grating strips 2042 may have a width greater than that of the plurality of first grating strips 2041. In some embodiments, each of the plurality of first and second grating strips 2041, 2042 may have a width ranging from about 50 nm to about 10 μm. The plurality of first grating strips 2041 may have a gap therebetween ranging from about 50 nm to about 10 μm. Each of the plurality of first and second grating strips 2041, 2042 may have a thickness ranging from about 0.1 μm to about 10 μm.

The polarized grating 204 is adapted for polarizing lights. A portion of the lights from the backlight source may be polarized through the gaps between the grating strips, and the remaining portion of the lights may be incident to a surface of the polarized grating 204 near to the first surface. The remaining portion of the lights may be reflected to the backlight source, rather than being absorbed by the polarized grating 204, as the surface of the polarized grating 204 near to the first surface is a reflection surface. The remaining portion of the lights being reflected may serve as incident lights and transmit again to the polarized grating 204 from the backlight source, until all lights emitted from the backlight source are absorbed by the polarized grating 204.

It should be noted that, under these conditions that each of the plurality of first and second grating strips 2041, 2042 has a width ranging from about 50 nm to about 10 μm, that the plurality of first grating strips 2041 have a gap therebetween ranging from about 50 nm to about 10 μm, and that each of the plurality of the first and second grating strips 2041, 2042 has a thickness ranging from about 0.1 μm to about 10 μm, lights passing through the polarized grating 204 are irrelevant to lights' wavelength, that is, both lights of three primary colors and white lights composed by lights of three primary colors may pass through the polarized grating 204.

In some embodiments, each grating strip of the polarized grating 204 may have a same width in a range from about 0.1 μm to about 10 μm. Gaps between every two grating strips may be the same, which ranges from about 50 nm to about 10 μm. More details may refer to FIG. 3 which schematically illustrates a cross-sectional view of a panel display device according to a second embodiment of the present disclosure. Referring to FIG. 3, the polarized grating 204 include a plurality of grating strips, and each grating strip has a same width. The other structures of the second embodiment are the same as those of the first embodiment, which are not described in detail herein.

The transmission light valve array 207 may be a liquid crystal layer or a MEMS light valve array. When the panel display device is a LCD device, the transmission light valve array 207 is a liquid crystal layer, where liquid crystal molecules (which can deflect under the control of electrical signals) may modulate lights. When the panel display device is a LED display device, the transmission light valve array 207 is a light valve array, where the light valve may modulate lights.

In some embodiments, the semiconductor switch array 206 is a thin film transistor array or a MEMS switch array. Thin film transistors in the thin film transistor array or MEMS switches in the MEMS switch array are able to control the transmission light valve array 207, such as the liquid crystal layer or the MEMS light valve array, so as to achieve the controlling of lights. In an embodiment, the semiconductor switch array 206 is a thin film transistor array including a plurality of thin film transistors 205. The structures of both the thin film transistors and the MEMS switches are the same as those of the conventional art, which are well known to those skilled in the art, and will not be described herein. In some embodiments, the thin film transistors array or the MEMS switches array may be disposed on the back of the second grating strips 2042.

In some embodiments, the semiconductor switch array 206 may further include a storage circuit and/or a control circuit which may be disposed at a position corresponding to the second grating strips 2042. The storage circuit is adapted for storing data required for operation of the panel display device, and the control circuit is adapted for controlling the operation of the panel display device. Accordingly, control data for the panel display device can be stored in advance in the storage circuit, so that scanning speed of the panel display device can be increased, and display quality can be improved.

In some embodiments, the backlight source 200 may emit white lights. The LCD device may further include an optical filter 208 disposed on the transmission light valve array 207. The optical filter 208 is adapted for filtering white lights and outputting lights of three primary colors. The optical filter 208 may include a filter for red lights, a filter for green lights and a filter for blue light.

In some embodiments, the panel display device may not include the optical filter 208 if the backlight source 200 emits sequential lights of three primary colors, where the sequential lights of three primary colors include lights of three primary colors which appear in a particular cycle or order, respectively. The lights of three primary colors may include red lights, green lights and blue lights.

In some embodiments, the panel display device may further include a top polarized layer 210 which is disposed on the transmission light valve array 207. The top polarized layer 210 is adapted for increasing contrast ratio of the panel display device.

Hereinafter, a method for manufacturing a panel display device will be described. To clarify the technical solution of the present disclosure, please refer to FIG. 5 to FIG. 9 which schematically illustrate cross-sectional views of intermediate structures of a panel display device formed using a manufacturing method according to one embodiment of the present disclosure.

Figure 5:
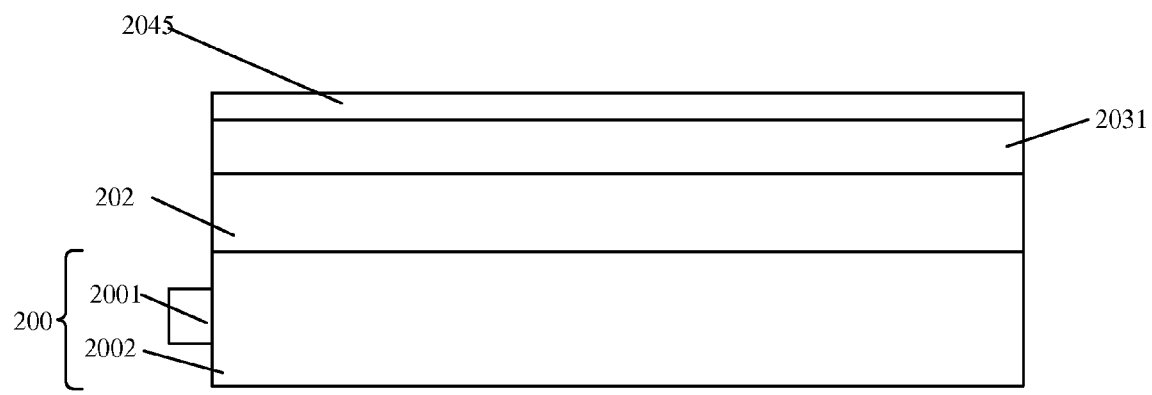
FIG. 5 to FIG. 9 schematically illustrate cross-sectional views of intermediate structures of a panel display device formed using a manufacturing method according to one embodiment of the present disclosure.

Firstly, referring to FIG. 5, a transparent back panel 202 and a backlight source 200 are provided. A first surface of the transparent back panel 202 is adapted for reflecting incident lights from the outside, and a second surface of the transparent back panel 202 is adapted for transmitting incident lights from the outside. The transparent back panel 202 may be made of glass. And the first surface may have a reflection coating film thereon. The backlight source 200 may be an edge-lighting backlight source or a bottom-lighting backlight source. In an embodiment, the backlight source 200 is an edge-lighting backlight source, and the transparent back panel 202 is made of glass.

Figure 6:
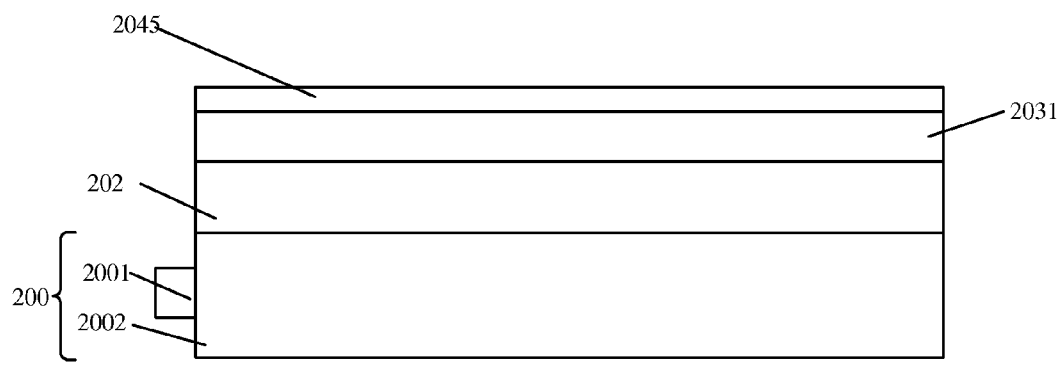

Referring to FIG. 6, a first insulation layer 2031 may be formed on the first surface of the transparent back panel 202. The first insulation layer 2031 may be made of a transparent insulating material, such as silicon oxide, silicon nitride, silicon oxynitride, silicon carbide or a combination thereof. The first insulation layer 2031 is adapted for buffering stress between the polarized grating being formed subsequently and the transparent back panel 202. In some embodiments, the first insulation layer 2031 may not be formed, and the polarized grating is formed directly on the transparent back panel 202.

Still referring to FIG. 6, a polarized layer 2045 is formed on the first surface of the transparent back panel 202. The polarized layer 2045 is used to form a polarized grating subsequently. A surface of the polarized layer 2045 near to the first surface is a reflection surface. In some embodiments, the polarized layer 2045 may be made of metal, such as copper, aluminum, gold, silver, titanium tungsten, or a combination thereof. The polarized layer 2045 may be formed by using a Physical Vapor Deposition (PVD), a sputtering or an electroplating process.

Figure 7:
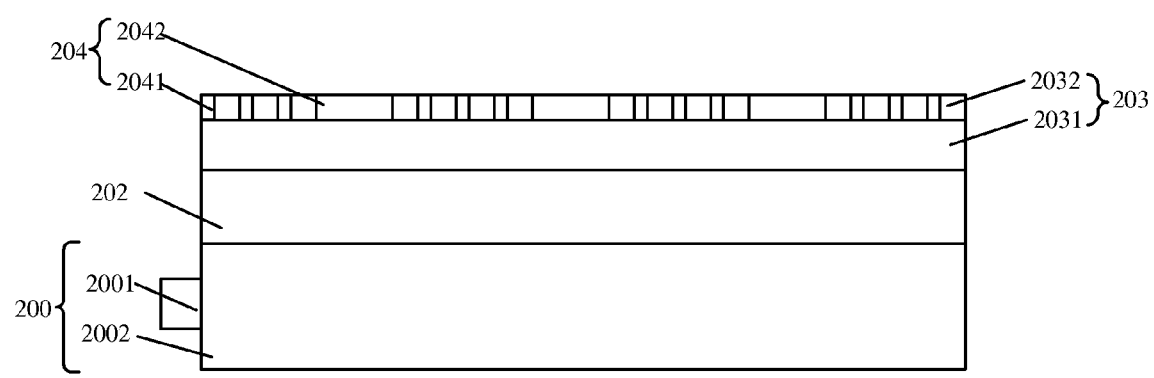

Referring to FIG. 7, a polarized grating 204 is formed by etching the polarized layer 2045. The polarized grating 204 includes a plurality of grating strips with gaps between neighbouring grating strips. The polarized grating 204 is adapted for polarizing lights. In some embodiments, the polarized grating 204 may include: a plurality of first grating strips 2041 and at least one second grating strip 2042. Gaps between the plurality of first grating strips 2041 may be the same. The position of the at least one second grating strip 2042 corresponds to that of the thin film transistors to be formed subsequently. The at least one second grating strip 2042 may have a width greater than that of the plurality of first grating strips 2041. Etching the polarized layer 2045 may be performed by using a wet etch process or a plasma etch process.

Figure 8:
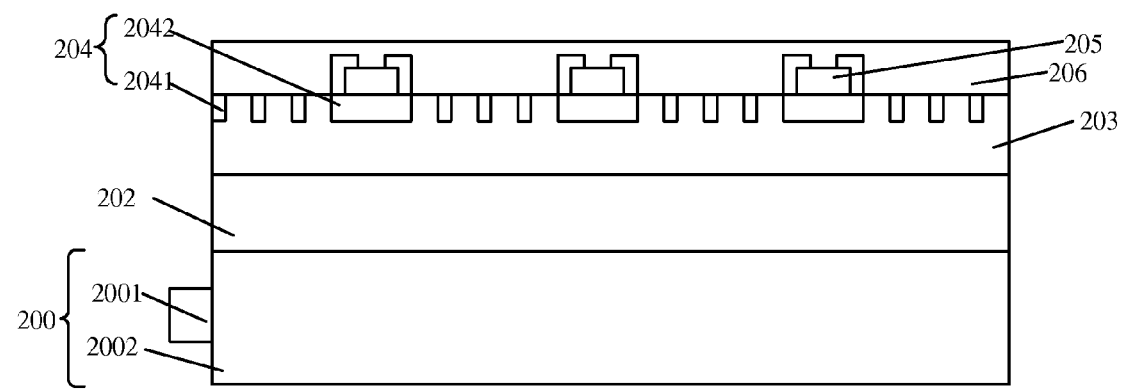

Referring to FIG. 8, a semiconductor switch array 206 is formed on a surface of the polarized grating 204 away from the first surface. The semiconductor switch array 206 is a thin film transistor array or a MEMS switch array. Thin film transistors in the thin film transistor array or MEMS switches in the MEMS switch array are able to control the liquid crystal layer or the MEMS light valve array of the transmission light valve array 207, so as to achieve the controlling of lights. In an embodiment, the semiconductor switch array 206 is a thin film transistor array including a plurality of thin film transistors 205.

Preferably, the semiconductor switch array 206 may further include a storage circuit and/or a control circuit which may be disposed at a position corresponding to the second grating strips 2042. The storage circuit is adapted for storing data required for operation of the panel display device, and the control circuit is adapted for controlling the operation of the panel display device. Accordingly, control data for the panel display device can be stored in advance in the storage circuit, so that scanning speed of the panel display device can be increased, and display quality can be improved.

Figure 9:
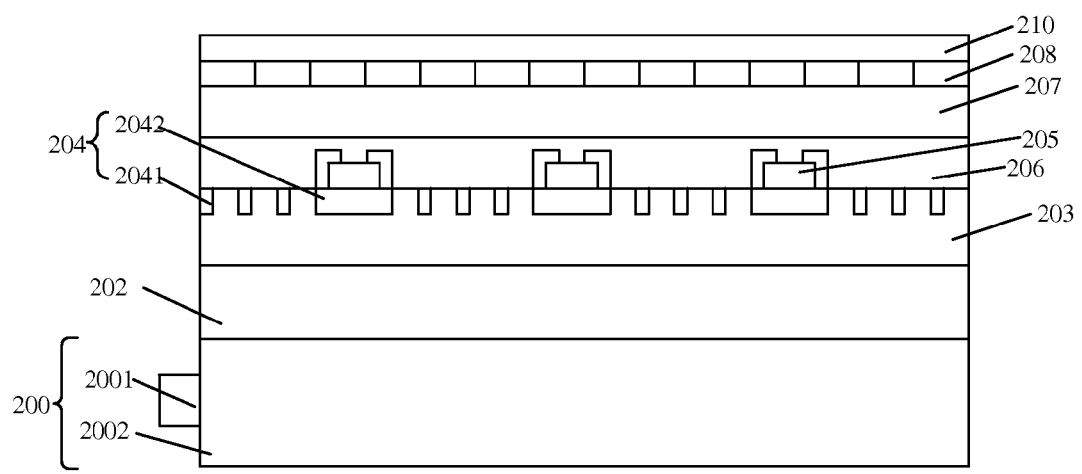

Last, referring to FIG. 9, a transmission light valve array 207 and a top polarized layer 210 may be formed on the semiconductor switch array 206 successively. The transmission light valve array 207 may be a liquid crystal layer or a MEMS light valve array. When the panel display device is a LCD device, the transmission light valve array 207 is a liquid crystal layer, where liquid crystal molecules (which can deflect under the control of electrical signals) may modulate lights. When the panel display device is a LED display device, the transmission light valve array 207 is a light valve array, where the light valve may modulate lights. The top polarized layer 210 may be formed using conventional techniques, which is not described in detail herein.

In conclusion, the panel display device according to the present disclosure has a polarized grating which can polarize lights from the backlight source by passing through neighbouring grating strips, which improves the utilization efficiency of lights from the backlight, decreases power consumption, thereby satisfying requirements of applications.

Optionally, a storage circuit and/or a control circuit may be formed at the back of the plurality of grating strips, where the storage circuit is adapted for storing data required for operation of the panel display device. Thereby scanning speed of the panel display device can be increased, and driving capability can be improved.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A panel display device, comprising:
   a transparent back panel, having a first surface and a second surface, where the first surface is adapted for reflecting incident lights, and the second surface is adapted for transmitting incident lights;
   a backlight source, disposed at one side of the second surface of the transparent back panel, which is adapted for emitting lights to the transparent back panel;
   a polarized grating, disposed at one side of the first surface of the transparent back panel, which comprises a plurality of grating strips with gaps formed between neighbouring grating strips, where the polarized grating enables the incident lights from the transparent back panel to be polarized and then pass through the gaps, and where a surface of the polarized gating near to the first surface of the transparent back panel is a reflection surface, so that a portion of the incident lights which are incident to the reflection surface can be reflected to the backlight source;
   a semiconductor switch array, disposed at one side of the first surface of the transparent back panel; and
   a transmission light valve array, disposed at a surface of the polarized grating and the semiconductor switch array, where the surface is far away from the first surface of the transparent back panel.

2. The panel display device of claim 1, where each of the plurality of grating strips has a same width in a range from about 50 nm to about 10 μm, and the gaps formed between neighbouring grating strips have a same width in a range from about 50 nm to about 10 μm.

3. The panel display device of claim 1, where the transmission light valve array is a liquid crystal layer or a MEMS light valve array, and the semiconductor switch array is a thin film transistor array or a MEMS switch array.

4. The panel display device of claim 1, where one of the plurality of grating strips has a thickness in a range from about 0.1 μm to about 10 μm.

5. The panel display device of claim 1, where the polarized grating comprises a plurality of first grating strips and a plurality of second grating strips, where gaps between the plurality of first grating strips are the same, the positions of the plurality of second grating strips correspond to that of the semiconductor switch array, and the plurality of second grating strips have a width greater than that of the plurality of first grating strips.

6. The panel display device of claim 5, where each of the plurality of first and second grating strips has a width ranging from about 50 nm to about 10 μm, and the plurality of first and second grating strips have gaps ranging from about 50 nm to about 10 μm.

7. The panel display device of claim 5, where the semiconductor switch array comprises a storage circuit and/or a control circuit, where the position of the storage circuit and/or the control circuit corresponds to that of the plurality of second grating strips, the storage circuit is adapted for storing data required for operation of the panel display device, and the control circuit is adapted for controlling the operation of the panel display device.

8. The panel display device of claim 1, where the polarized grating is made of metal comprising copper, aluminum, gold, silver, titanium, tungsten, or a combination thereof.

* * * * *